Patented Mar. 4, 1952

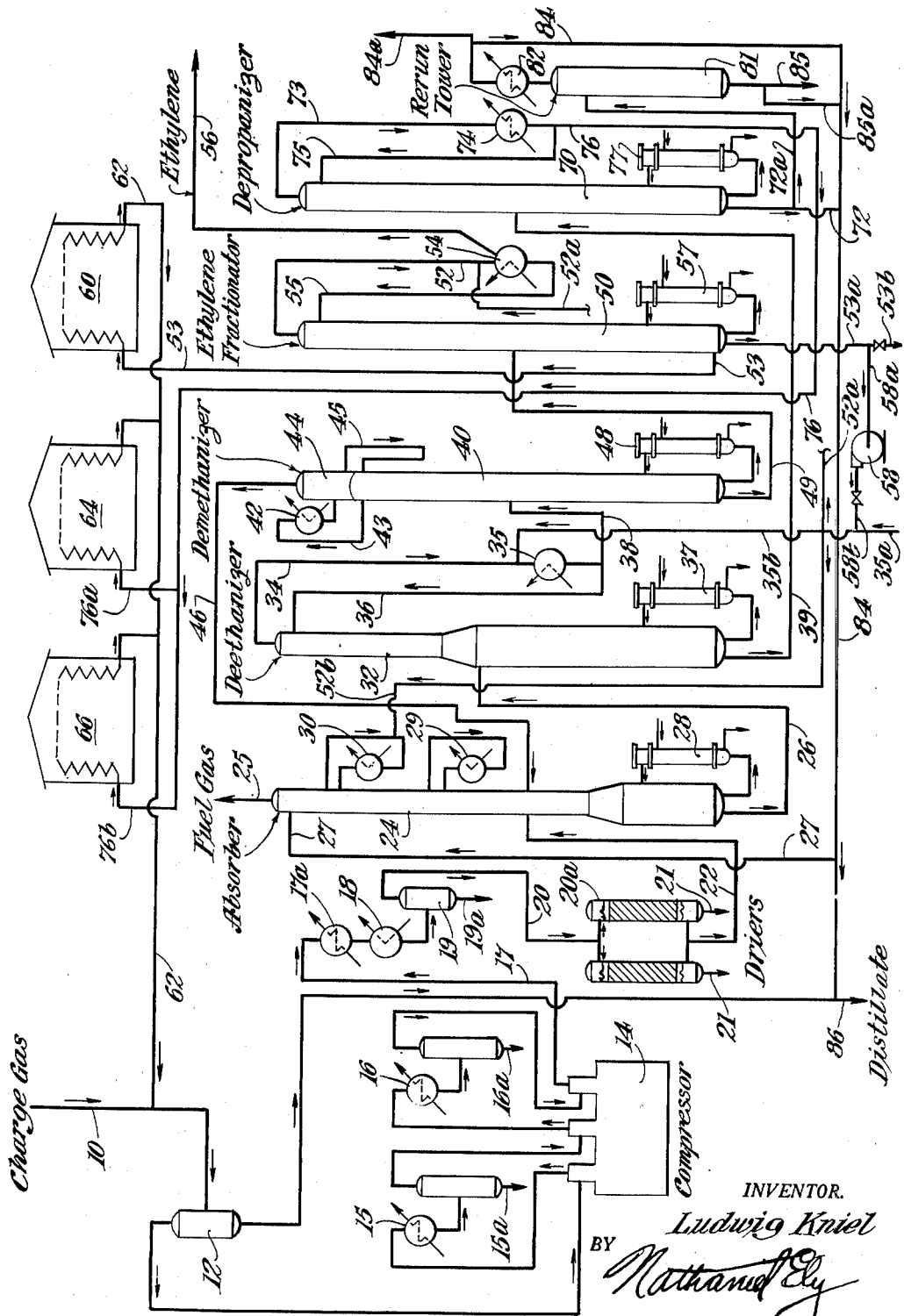

2,588,323

UNITED STATES PATENT OFFICE 2,588,323

PRODUCTION OF ETHYLENE

Ludwig Kniel, Scarsdale, N. Y., assignor to The Lummus Company, New York, N. Y., a corporation of Delaware Application September 3, 1949, Serial No. 114,023

11 Claims. (Cl. 260—677)

This invention relates to the production and recovery of olefinic hydrocarbons and more particularly high purity ethylene. It is a continuation-in-part of my copending application Serial No. 717,264, Patent No. 2,573,341, filed December 19, 1946, entitled "Production of Ethylene," which was a continuation-in-part of my copending application Serial No. 493,176, filed July 2, 1943, and entitled "Hydrocarbon Conversion," now abandoned.

It is well known that the hydrocarbon gas field, and particularly, refinery off-gases offer a very large potential supply of olefinic hydrocarbon such as ethylene and propylene which do not otherwise occur naturally, and that these gases are of tremendous importance in the synthetic chemical field. They are useful not only for the manufacture of synthetic alcohols and rubber but also for certain types of plastics and many other purposes. However, ethylene and propylene are very difficult to separate from the other gases such as propane and ethane with which they are normally associated. In addition, the large amounts of contaminant gases such as methane and hydrogen usually found in refinery off-gases necessitates the use of large and expensive equipment for the separation of the ethylene. In the past, methods for separating the ethylene from such contaminants have unavoidably incurred the loss of substantial amounts of valuable components such as ethylene. Furthermore, the variation in concentration of the components in the various hydrocarbon fractions has made it extremely expensive to construct a single system which would be of general application to the recovery of the olefinic hydrocarbons from the various feeds. Therefore, if the relatively pure olefins are to find an expanding market, is it necessary to provide substantial economics of utilities in the separation of the valuable olefins from the gases with which they are normally associated.

The broad object of my invention is to recover substantially pure ethylene from a gaseous mixture containing large proportions of methane and hydrogen by the use of a rectifying absorber wherein substantially all of the methane and hydrogen may be removed as overhead in the tower, thus relieving the rest of the system following the tower of this load and materially reducing the unavoidable loss of the valuable components such as ethylene.

A specific object of my invention is to introduce methyl alcohol into the system following the de-ethanizer and to remove the methyl alcohol from the ethylene-ethane fractionator to aid in removing moisture from the system which is not removed in the driers.

A still further object of the invention is to provide a moisture absorbing, substantially non-reactive, liquid injection system for an ethylene recovery unit in which the liquid may be injected occasionally or continuously to prevent plugging of the distillation units as well as the condenser units to produce a high degree of purity of ethylene.

Further objects and advantages of my invention will appear from the following description thereof taken in conjunction with the attached drawings, in which the figure is a schematic process flow diagram for the production and recovery of high purity ethylene.

On accordance with my invention, I find that ethylene can be economically recovered from various types of available hydrocarbon gas streams in which the hydrogen and methane are generally a large proportion, and the ethylene, a rather small proportion, if present at all. The following table lists the compositions of several typical streams, but is not intended to be the extent to which my invention is applicable.

*Composition of ethylene bearing gas streams*

[Mol Per Cent]

| Comp. | (a) Coke Oven Gas | (b) Refinery Off Gas | (c) Pyrolysis Gas from Propane |
|---|---|---|---|
| $H_2$ | 44.0 | 4.0 | 10 |
| $CH_4$ | 25.0 | 11.0 | 25 |
| $C_2H_4$ | 4.0 | 5.0 | 27 |
| $C_2H_6$ | | 22.0 | 4 |
| $C_3H_6$ | 2.0 | 11.0 | 15 |
| $C_3H_8$ | | 45.0 | 16 |
| Heavier | | | 3 |
| CO | 6.0 | | |
| $CO_2$ | 4.0 | 2.0 | |
| $N_2$ | 15.0 | | |
| Total | 100.0 | 100.0 | 100.0 |

With such high concentrations of hydrogen and methane, I find it important to remove such materials first not only to render subsequent separation of the olefins easier, but also, to materially reduce the loads on other parts of the fractionating system. I accomplish this in one tower combining absorption of the heavier constituents in an absorbent oil of an aromatic nature with rectification of the mixture in the absorber whereby all of the hydrogen and nearly all of the methane are removed with practically no loss of ethylene. The fat oil, that is, the rich bottoms product from the rectifying absorption tower, is thereafter treated to recover a substantially pure ethylene product and a series of paraffin and olefin fractions other than ethylene, which are returned to heaters for cracking to form an aromatic distillate, part of which is utilized in the absorber as the absorption oil. Operating in this manner, I obtain optimum yields of high quality ethylene at relatively low utility cost due in part, to the utilization of the aromatic by-products built up in the system.

Another advantage of the absorptive type of recovery unit, hereinafter described, is that it may be readily adapted to the use of charging stocks varying widely in composition. Refinery off-gases containing propane, ethane, and ethylene nearly always represent a composite product gas from various refinery units, the composition and volume of the composite off-gas may fluctuate considerably. If, therefore, this gas is taken directly to the heaters for cracking, these heaters cannot be operated at optimum capacity and for optimum yields at all times due to the fluctuations in the concentration of hydrogen and methane in the charge gases. For this reason, I find it desirable to carry out a preliminary resolution of the charge gas into the ethylene producing constituents and the lighter, non-useful gases such as hydrogen and methane.

Assuming a refinery off-gas feed of a composition shown in the table above as entering the system at 10, the gas is passed through knock out drum 12 and then to compressor 14 where it is compressed in several stages to the desired superatmospheric pressure. The heat of compression is conveniently removed in the interstage coolers 15 and 16, the tanks 15a and 16a being used as liquid-gas separators. The high pressure gas then passes by line 17 through final cooler 17a after which it may be sub-cooled by refrigeration at 18 if desired and then passed to tank 19. Any condensed aromatic fractions heavier than pentane may be removed through line 19a. The mixture then passes through the dryers 20 from which the accumulated moisture may be removed periodically through lines 21 by suitable methods well known in the drying art.

The mixture which discharges from the dryers 20 includes some of the moisture from the aftercooler 17a but is substantially dried to avoid the formation of hydrates. This mixture is then passed by line 22 to the rectifying-absorber 24 which is also sometimes referred to as an absorber-stripper. It consists of an upper absorption section and a lower stripping or stabilizing section and operates essentially as a fractionation tower as well as a countercurrent absorber. It is preferably operated such that a separation is made between the methane and lighter hydrocarbons which are removed overhead as to fuel gas line 25, and the ethylene and heavier fractions which are withdrawn as fat oil through line 26. As will hereinafter be described, aromatic fractions continuously produced in the cracking heaters and retained in the absorption system to the extent necessary, furnish the lean absorption oil which is introduced through line 27 to tower 24. Reboiler 28 is provided at the bottom of the column 24 in order to continuously drive off the most volatile materials—methane and hydrogen—and, as a result, the fat oil leaving tower 24 carries substantially no hydrogen and very little methane to interfere with further steps in the process.

The absorber 24 is normally equipped with two or more intercoolers 29 and 30 in the absorption section to control the absorption rate at this point. These coolers are necessary because the absorption reaction is decidedly exothermic and efficient absorption requires moderate temperatures.

The purity of the ethylene product is, in large measure, determined by the performance of the fractionating absorber 24. The principal contaminants present in the ethylene product are traces of methane and ethane. The separation of ethylene from ethane does not present any real difficulties and may be carried to any desired degree. The elimination of the methane in the absorber, on the other hand, is imperative as the proper functioning of the equipment downstream of the absorber is dependent on absorber performance. Larger amounts of methane than anticipated in the bottoms from the absorber would jeopardize the operation of the deethanizer and ethylene fractionator by inability to condense the reflux in these towers at the temperature required to obtain the desired concentrations in the overheads from each of these towers.

Experience has shown that at a pressure of 440 p. s. i. g. and 70° F. entering oil temperature, with the dewpoint of the feed at 100° F. and using an aromatic distillate formed in the system as the absorption medium, a lean oil rate of not over 4.2 pounds per pound of feed is sufficient to assure the retention of 99 mol per cent of the ethylene entering in the feed to the rectifying absorption tower. With this lean oil rate the absorber top and bottom temperatures are approximately 180° F. apart and little intercooling is necessary. All of the hydrogen, 96 per cent of the methane and only a small amount of ethylene are rejected in the absorber overhead at 25. Absorption oil rates of less than 4 pounds per pound of absorber charge may be used but an increased amount of intercooling is necessary with decreased oil rates.

The fat oil leaving absorber 24 at 26 is forwarded to deethanizer tower 32 which is operated under such temperature and pressure that the ethane-ethylene fraction is completely removed overhead in line 34. This is condensed in the refrigerated reflux condenser 35 and reflux is returned to the column through line 36. The balance of the overhead is drawn off in line 38 to the demethanizer tower 40 which is provided with an overhead condenser 42 on the line 43 in which a portion of the mixture from the top of tower 40 is condensed. A separate tank 44 is built into the top of the column serving as an accumulator for the vapor-liquid mixture from condenser 42. A trap line 45 returns the liquid to the column 40 as reflux and the vapors pass through line 46 to tower 24. These vapors include any remaining methane, and depending on the temperature in the condenser 42, more or less ethylene. Preferably, I make a crude separation allowing sufficient ethylene to go overhead to be certain that all methane is removed. This overhead is then returned to the absorber 24 at about the same point in column 24 as line 22. Reboiler 48 is provided to maintain the bottoms temperature of the demethanizer 40 at the desired point and the bottoms product, a substantially pure ethane-ethylene fraction, is removed by line 49 to the ethylene fractionator 50.

In tower 40, a complete separation of the ethylene and methane is uneconomical because of the low operating temperature that would be required to effect such a separation in this tower. By passing a small per cent of the ethylene off with the methane as overhead, the operating temperature in column 40 may be raised to an economical point. The small amount of ethylene in the overhead is thus continuously recycled between the absorber 24 and demethanizer 40. It has been found that it is only necessary to recycle about three per cent of the ethylene entering tower 40 to obtain the desired operating temperatures in this tower.

The ethylene fractionator 50, is conveniently operated under such conditions that a substantially complete separation is made between the ethylene removed in the overhead line 52 and the ethane which is removed as bottoms through line 53. The ethane may then be passed to heater 60 for further cracking as hereinafter described. A refrigerated condenser 54 is provided on the overhead line 52 to supply the necessary reflux through line 55. The net ethylene product is removed through line 56. Reboiler 57 is used to maintain the desired bottom temperature. Practically 100 per cent recovery is accomplished in this tower and ethylene of over 97% purity may be obtained. With demethanizer 40, purity of product in excess of 99% has been attained.

Due to the low temperatures and high pressures present in various parts of the system, it is found that slight traces of water will promote hydrate formation. It may be found desirable in some cases to introduce methyl alcohol at critical points in the system, generally in the overhead line of a particular tower just before the vapor condenser.

A complete methanol injection system as shown in the drawing may call for introduction into the overhead of the ethylene fractionator 50 and the deethanizer 32 as well as into one or more of the upper intercoolers of the rectifying-absorber 24. Under certain conditions one or more of these points of introduction may be omitted and others may be substituted therefore.

In the drawing, fresh methanol is fed to the system through line 35a. Assuming that it is to be delivered to the three above-mentioned points, it will pass from line 35a through line 52b to the inlet line of intercooler 30. This small amount of methanol will prevent hydrate formation in intercooler 30 and will then pass into column 24 from which it will be removed in bottoms line 26. From here it will pass to deethanizer 32 along with the bottom product from the rectifying-absorber. In the deethanizer 32, the alcohol goes up the column to combine with additional alcohol hereinafter discussed, and all of this methyl alcohol goes overhead in line 34.

If desired methyl alcohol may also be directly passed from line 35a through line 35b to line 34, the inlet line to the deethanizer overhead condenser 35 thereby further preventing hydrate formation therein. This alcohol is in part recycled through line 36 to the upper part of tower 32 and then to line 34 as hereinbefore discussed.

The rest of the alcohol from condenser 35 is passed to demethanizer 40 through line 38. In one instance it was found desirable to recycle from one half to two thirds of the alcohol in condenser 35 through the line 36.

The other part of the deethanizer overhead containing the remainder of the methanol is directed to demethanizer column 40 from which it is removed at the bottom through line 49. It then passes to ethylene fractionator 50 from which it is removed as bottoms separately from the ethane. Methyl alcohol and ethane form a two phase liquid mixture at the bottom of tower 50 and accordingly substantially all the alcohol can be separated and removed through line 53a while the ethane is removed by line 53. Impure alcohol may be withdrawn from the system at 53b. Pump 58 is used to recycle alcohol from lines 53a and 58a to lines 58b and 35b.

Alcohol may be passed from line 35a through line 52a to line 52, the inlet line to condenser 54 of ethylene fractionator 50. Substantially no alcohol is lost through line 56, it being all returned through line 55 to tower 50 and then to the bottoms line 53a.

It will not be necessary under all conditions to have alcohol injected at all these points. However, in any case, it will be noted that the alcohol follows well defined paths and is not lost by commingling with other streams. It will normally be found only in the following places of importance: line 35a, line 52b, condenser 30, the lower portion of tower 24, line 26, the upper portion of tower 32, lines 34, 36, and 38, the lower portion of tower 40, line 49, the lower portion of tower 50, and lines 53a, 53b, 58a, 58b, 35b, 52a, and 52b. Thus it can be seen that there is substantially a closed alcohol circuit with an inlet at 35a and outlet at 53b.

Suitable quantities of alcohol to be injected are of the order of one percent of the deethanizer overhead and two tenths of a percent of the ethylene fractionator overhead.

It is contemplated that anhydrous methyl alcohol will be used and reused until the alcohol is diluted to less than fifty percent. It will then be run off and concentrated in an external distillation system if desired.

The heavy material removed from the bottom of deethanizer 32 by line 39, consisting of propane, propylene, and higher hydrocarbons, is separated in depropanizer 70 into an aromatic distillate as bottoms removed through line 72 and a propane-propylene overhead removed through line 73. The overhead is condensed at 74 to furnish reflux through line 75 and a cracking stock, largely propane and propylene, removed through line 76, is fed through lines 76a and 76b to sections 64 and 66 of the heaters. The lower part of depropanizer 70 is provided with bottoms reboiler 77.

The reaction sections 60, 64 and 66 of the heaters are operated at the optimum temperatures for the cracking of the different fractions entering the heaters. Temperatures in the order of 1410° F. are preferable for cracking propane-propylene mixtures whereas temperatures as high as 1430° F. are necessary for the cracking of ethane. When cracked at their optimum temperatures I have noted a production of nearly twice as much ethylene as compared to the production of ethylene when the same quantity of ethane and propane are treated simultaneously in a single furnace.

In addition to the ethylene, the line 62 feeds to the charge line 10 considerable amounts of hydrogen, ethane, propane, propylene, higher hydrocarbon gases, and substantial quantities of aromatics. The hydrogen, methane, ethylene, higher hydrocarbons, and the aromatics are all formed by the cracking operation in the heaters. The aromatics form the active components in the absorption oil and with the other hydrocarbons are treated in the system as set forth above.

With the formation of substantial quantities of ethylene in the heaters and the removal of the unreactive hydrogen and methane in the absorber, it is possible to produce and recover nearly twice as much ethylene with the same equipment as was otherwise possible. The mixing of the effluent of the different heaters with the charge has also proved particularly satisfactory.

It will thus appear that the normally gaseous feed is first introduced to the absorber rather than to the heater as in most prior practice. This is in the nature of a prefractionating step in that it immediately makes it possible to eliminate most of the methane and all of the hydrogen, thereby reducing the volume of material being treated in the remainder of the system.

An important feature of my invention, therefore, is the opportunity to obtain maximum yields of a high purity ethylene with minimum yields of other materials as by-products and the opportunity to operate all units under optimum conditions while at the same time providing the necessary flexibility for varying compositions of feed to the ethylene recovery system.

If it is found necessary to change the quality of the distillate removed from the depropanizer for absorption purposes, a part of the bottoms from the depropanizer 70 is removed through line 72a to rerun tower 81. The rerun tower rejects either the heavy ends, or in case of an accumulation of light components, the front end fractions of the lean oil. If there is an accumulation of heavy ends in the lean oil from the bottom of tower 70, it may be rejected by way of line 85 and the remaining lighter components passed back to line 27 by way of the overhead line 84. If there is an excess of the light or front end fractions the bottoms from rerun tower 81 will be passed through line 85a to line 84 and the light fractions will pass from the system by way of line 84a. With this control, a pre-determined quality of charge oil can be made for the absorber 24.

When recovering a 93 per cent pure ethylene product and at furnace recycle ratios (recycle-fresh feed) of approximately 1.0, the principal tower operating conditions are those shown in the following tabulation:

*Summary of tower operating conditions*

| Designation | Pressure p.s.i.g. | Temperature °F. | | | Bottoms | Reflux Ratio Mol/Mol O.H. |
|---|---|---|---|---|---|---|
| | | O. H. | Top | Feed | | |
| Absorber | 460 | 0 | [1] 0 | 0 | 125 | |
| Deethanizer | 450 | 18 | 36 | 120 | 232 | 3.0 |
| Ethylene Fractionator | 385 | 1 | 4 | 20 | 49 | 5.2 |
| Depropanizer | 220 | 112 | 106 | 225 | 350 | 1.0 |
| Rerun Tower | 25 | 150 | 260 | 350 | [2] 400 | 0.4 |

[1] Temperature of lean oil entering.
[2] Max.

The composition of the lean oil introduced through line 27 to the rectifying-absorber 24 will vary considerably depending upon the charge to the system and the conditions of cracking in heaters 60, 64 and 66. It is largely benzene, toluene, and naphtha but, in addition, has a considerable percentage of butene, pentene, hexene, and heavier hydrocarbons. An example of one analysis of oil after repeated recycle in the refinery off-gas recovery system is as follows:

*Composition of lean oil*

| Component | Boiling Range °F. | Specific Gravity | Mol Weight | Weight Per Cent |
|---|---|---|---|---|
| Propylene | −54 | | | 1.1 |
| Propane | −42 | | | 2.2 |
| Butenes | 20 | | | 8.2 |
| Butane | 32 | | | .6 |
| Pentenes | 35–172 | .75 | 71 | 5.5 |
| Benzene | 172–181 | .88 | 78 | 44.1 |
| Hexenes | 181–228 | .85 | 82 | 4.4 |
| Toluene | 228–234 | .85 | 92 | 9.9 |
| Naphtha | 234–316 | .84 | 110 | 12.0 |
| Heavier | 316 plus | .93 | 165 | 12.0 |
| Total | | | 82 | 100.0 |

It will thus be seen that the foregoing system has the following advantages as applied to the purification of ethylene.

(1) Inherent flexibility to take adequate care of wide fluctuations in volume and composition of the charge gas.

(2) Joint and, therefore, economical resolution of the charged and effluent gas streams into fuel gas, ethylene product, and closely fractionated furnace charge streams.

(3) Recovery of a highly purified product at very small losses and without the need for fractionation at extremely low temperature.

(4) Ease of control by the single expedient of adjusting the operating temperature level of the fractionating absorber.

(5) Avoidance of special materials of construction.

While I have shown and described a preferred form of embodiment of my invention, I am aware that variations may be made thereto and I therefore desire a broad interpretation of my invention within the scope of the disclosure herein and the following claims.

I claim:

1. An improved process for the conversion of a normally gaseous hydrocarbon mixture heavier than methane to an unsaturated hydrocarbon of lower molecular weight which comprises passing a stream of the hydrocarbon through a heated conversion zone under conditions of temperature, pressure, and time such as to produce an optimum yield of a hydrocarbon of lower molecular weight and a minimum yield of hydrocarbons of higher molecular weight, cooling said hydrocarbons to prevent further reaction, drying said cooled hydrocarbons to remove water therefrom, passing said cooled effluent to a recovery means, separating gases lighter than ethylene from the effluent by absorption-rectification, separating the ethane, ethylene, and methane fraction from the heavier effluent in a deethanizer in the presence of refrigerated reflux, injecting methyl alcohol into the deethanizer overhead, removing the net deethanizer overhead and subjecting it to further rectification to drive off fractions lighter than ethylene, fractionating the rectified deethanizer overhead in the presence of refrigerated reflux into an ethylene overhead and a bottoms comprising ethane and alcohol, drawing off the alcohol separately from the ethane bottoms, and drawing off the ethane.

2. The improved process for the conversion of a normally gaseous hydrocarbon mixture heavier than methane to an unsaturated hydrocarbon of lower molecular weight claimed in claim 1 where the methyl alcohol injected into the deethanizer overhead is less than 1% of said overhead.

3. An improved process for the conversion of a normally gaseous hydrocarbon mixture heavier than methane to an unsaturated hydrocarbon of lower molecular weight which comprises passing a stream of the hydrocarbon through a heated conversion zone under conditions of temperature, pressure, and time such as to produce an optimum yield of a hydrocarbon of lower molecular weight and a minimum yield of hydrocarbons of higher molecular weight, cooling said hydrocarbons to prevent further reaction, drying said cooled hydrocarbons to remove water therefrom, passing said cooled effluent to a recovery means, separating gases lighter than ethylene from the effluent by absorption-rectification, separating the ethane, ethylene, and methane fraction from the heavier effluent in a deethanizer in the presence of refrigerated reflux, removing the net deethanizer overhead and subjecting it to further rectification to drive off fractions lighter than ethylene, fractionating the rectified deethanizer overhead in the presence of refrigerated reflux, into an ethylene overhead and a bottoms comprising ethane and alcohol, injecting methyl alcohol into said ethylene overhead, drawing off the alcohol separately from the ethane bottoms, and drawing off the ethane.

4. The improved process for the conversion of a normally gaseous hydrocarbon mixture heavier than methane to an unsaturated hydrocarbon of lower molecular weight claimed in claim 3 where the methyl alcohol injected into said ethylene overhead is less than $\frac{1}{10}$ of a percent of said overhead.

5. An improved process for the conversion of a normally gaseous hydrocarbon mixture heavier than methane to an unsaturated hydrocarbon of lower molecular weight which comprises passing a stream of the hydrocarbon through a heated conversion zone under conditions of temperature, pressure, and time such as to produce an optimum yield of a hydrocarbon of lower molecular weight and a minimum yield of hydrocarbons of higher molecular weight, cooling said hydrocarbons to prevent further reaction, drying said cooled hydrocarbons to remove water therefrom, passing said cooled effluent to a recovery means, separating gases lighter than ethylene from the effluent by absorption-rectification, separating the ethane, ethylene, and methane fraction from the heavier effluent in a deethanizer in the presence of refrigerated reflux, injecting methyl alcohol into the deethanizer overhead, removing the net deethanizer overhead and subjecting it to further rectification to drive off fractions lighter than ethylene, fractionating the rectified deethanizer overhead in the presence of refrigerated reflux into an ethylene overhead and a bottoms comprising ethane and alcohol, injecting methyl alcohol into said ethylene overhead, drawing off the alcohol separately from the ethane bottoms, and drawing off the ethane.

6. An improved process for the conversion of a normally gaseous hydrocarbon mixture heavier than methane to an unsaturated hydrocarbon of lower molecular weight which comprises passing a stream of the hydrocarbon through a heated conversion zone under conditions of temperature, pressure, and time such as to produce an optimum yield of a hydrocarbon of lower molecular weight and a minimum yield of hydrocarbons of higher molecular weight, cooling said hydrocarbons to prevent further reaction, drying said cooled hydrocarbons to remove water therefrom, passing said cooled effluent to a recovery means, separating gases lighter than ethylene from the effluent by absorption-rectification, separating the ethane, ethylene, and methane fraction from the heavier effluent in a deethanizer in the presence of refrigerated reflux, injecting less than 1% of methyl alcohol into the deethanizer overhead, removing the net deethanizer overhead and subjecting it to further rectification to drive off fractions lighter than ethylene, fractionating the rectified deethanizer overhead in the presence of refrigerated reflux to produce an ethylene overhead and a bottoms comprising ethane and alcohol, injecting less than $\frac{1}{10}$ of 1% of methyl alcohol into said ethylene overhead, drawing off the alcohol separately from the ethane bottoms, and drawing off the ethane.

7. An improved process for the conversion of a normally gaseous hydrocarbon mixture heavier than methane to an unsaturated hydrocarbon of lower moleculer weight which comprises passing a stream of the hydrocarbon through a heated conversion zone under conditions of temperature, pressure, and time such as to produce an optimum yield of a hydrocarbon of lower molecular weight and a minimum yield of hydrocarbons of higher molecular weight, cooling said hydrocarbons to prevent further reaction, drying said cooled hydrocarbon to remove water therefrom, passing said cooled effluent to a recovery means, separating gases lighter than ethylene from the effluent by absorption-rectification, separating the ethane, ethylene, and methane fraction from the heavier effluent in a deethanizer in the presence of refrigerated reflux, injecting methyl alcohol into the deethanizer overhead, removing the net deethanizer overhead containing at least a part of said alcohol, further rectifying said overhead thereby driving off fractions lighter than ethylene and obtaining a bottom product including alcohol, ethane, and ethylene, fractionating said bottom product in an ethylene fractionator in the presence of refrigerated reflux, into an ethylene overhead and an alcohol and ethane bottoms, injecting alcohol into the overhead of said ethylene fractionator, withdrawing substantially pure ethylene from said overhead, recycling all of said alcohol to said fractionator, separately withdrawing alcohol and ethane from the bottom thereof, and recycling said alcohol to the deethanizer overhead and to the overhead from the ethylene fractionator.

8. The improved process for the conversion of a normally gaseous hydrocarbon mixture heavier than methane to an unsaturated hydrocarbon of lower molecular weight claimed in claim 7 wherein at least a part of said last mentioned alcohol is withdrawn and passed to an external concentration system, concentrated, and returned to circulation whereby the concentration of methyl alcohol in circulation is greater than 50%.

9. The improved process for the conversion of a normally gaseous hydrocarbon mixture heavier than methane to an unsaturated hydrocarbon of lower molecular weight claimed in claim 8 wherein the alcohol is concentrated in said external concentration system to a point where substantially anhydrous methyl alcohol is returned to circulation.

10. An improved process for the conversion of a normally gaseous hydrocarbon mixture heavier than methane to an unsaturated hydrocarbon of lower molecular weight which comprises passing a stream of the hydrocarbon through a heated conversion zone under conditions of temperature, pressure, and time such as to produce an optimum yield of hydrocarbon of lower molecular weight and a minimum yield of hydrocarbons of higher molecular weight, cooling said hydrocarbons to prevent further reaction, drying said cooled hydrocarbons to remove water therefrom, passing said cooled effluent to a recovery means comprising a rectifying-absorber having at least one intercooler thereon, passing methyl alcohol from an alcohol distribution system to the inlet line to said intercooler thereby preventing hydrate formation therein, passing said alcohol from said intercooler to said rectifying-absorber, separating gases lighter than ethylene from an alcohol-containing effluent in said rectifying-absorber, separating the ethane, ethylene, and methane fraction from the alcohol-containing heavier effluent in a deethanizer in the presence of refrigerated reflux, passing methyl alcohol from an alcohol distribution system to the overhead line of said deethanizer, passing a part of said alcohol-containing overhead to said deethanizer, separating said alcohol from said heavier constituents therein whereby substantially no methyl alcohol goes to the bottom of said deethanizer, returning said alcohol to said deethanizer overhead line, removing the net deethanizer overhead and alcohol contained therein and subjecting it to further rectification in a demethanizer thereby driving off fractions lighter than ethylene, fractionating in the presence of refrigerated reflux the rectified alcohol-containing deethanizer overhead into an ethylene overhead and a two phase bottoms, the lighter phase comprising ethane and the heavier phase comprising alcohol, injecting methyl alcohol from an alcohol distribution system into said ethylene overhead, separating said lighter ethane phase from said heavier alcohol phase, returning at least a part of said heavier alcohol phase to the alcohol distribution system, and passing a second part of said heavier alcohol phase to an alcohol concentration system.

11. The improved process claimed in claim 10 wherein the concentration of alcohol in the alcohol distribution system is at least 50%.

LUDWIG KNIEL.

REFERENCES CITED

The following references are of record in the file of this patent:

UNITED STATES PATENTS

| Number | Name | Date |
|---|---|---|
| 2,014,724 | Eastman | Sept. 17, 1935 |
| 2,168,610 | Schutt | Aug. 8, 1939 |
| 2,187,631 | Schutt | Jan. 16, 1940 |
| 2,378,067 | Dorsett et al. | June 12, 1945 |
| 2,483,869 | Arnold | Oct. 4, 1949 |